F. G. BUTLER.
MILK-SETTING APPARATUS.
No. 194,510. Patented Aug. 28, 1877.
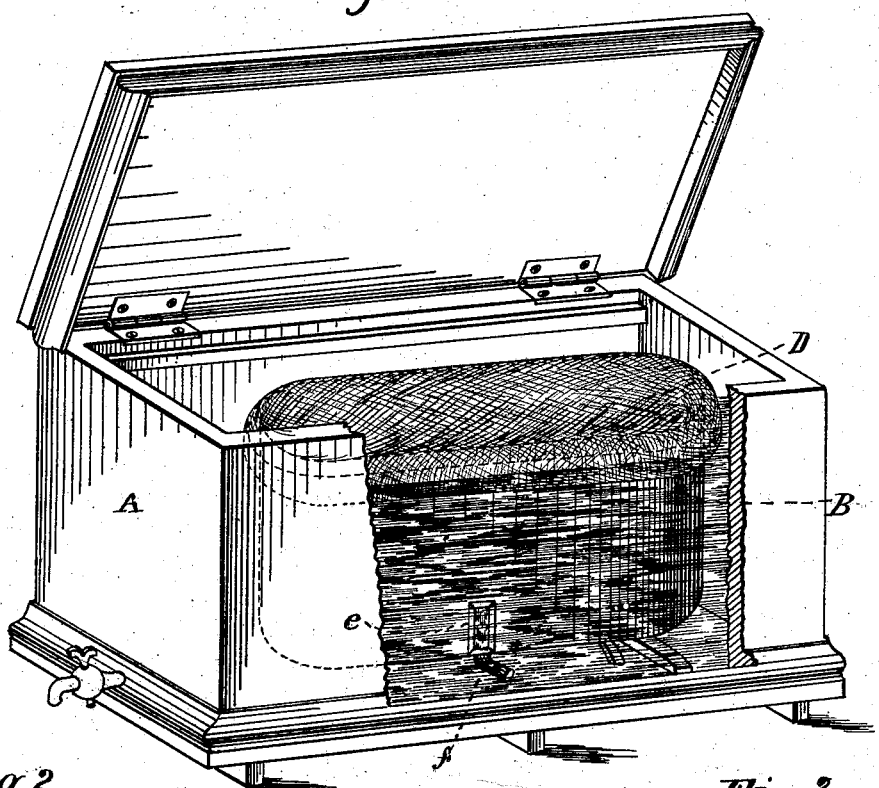
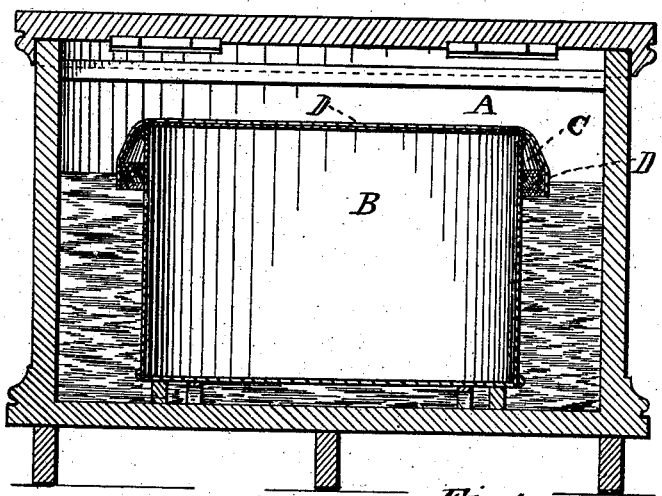
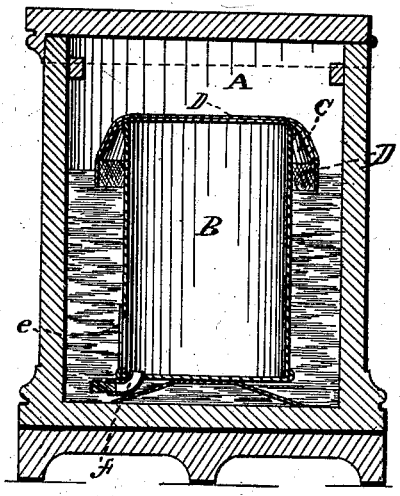
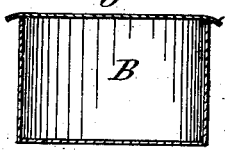
Witnesses
W. R. Edelen.
Penn. Halsted
Inventor
Francis G. Butler

UNITED STATES PATENT OFFICE.

FRANCIS G. BUTLER, OF BELLOWS FALLS, VERMONT, ASSIGNOR TO THE VERMONT FARM MACHINE COMPANY, OF SAME PLACE.

IMPROVEMENT IN MILK-SETTING APPARATUS.

Specification forming part of Letters Patent No. 194,510, dated August 28, 1877; application filed March 6, 1877.

*To all whom it may concern:*

Be it known that I, FRANCIS G. BUTLER, of Bellows Falls, in the county of Windham and State of Vermont, have invented certain new and useful Improvements in Apparatus for Setting Milk for Raising Cream; and I do hereby declare that the following is a full, clear, and exact description thereof, which will enable others skilled in the art to which it appertains to make and use the same, reference being had to the accompanying drawings, and to letters of reference marked thereon, which form a part of this specification.

My improvements relate to the raising of cream from milk placed in closed vessels; and consist in a novel mode of excluding the air and all foreign and deleterious matters and gases from the milk, and also in a simple mode of ascertaining when all the milk has been drawn off from the vessel, so as then to stop the flow and leave the cream alone in the vessel.

In the William Cooley method of setting and raising cream, his cans are placed in water at a low temperature, and the covers positively held down to the can by weights or fastenings, and the cans then placed in water, which may be deep enough to entirely submerge the can.

I avail myself of the covered can and the cooling of the filled can by depositing the same in water; but, in order to secure an equalization of temperature to the inclosed milk, I do not entirely submerge the covered can, nor need the water in the tank reach up to the bottom line of the can-cover; but, on the contrary, I employ a hood or outer cover of fibrous, or textile, or kindred material, such as felt, blanketing, &c., which is capable of readily absorbing and drawing up water by capillary attraction, so as to become saturated therewith.

To describe my invention more fully I refer to the drawings, which illustrate one form of simple apparatus for practicing the same—

Figure 1 being a perspective view, Figs. 2 and 3 vertical sections, and Fig. 4 a detail, showing a modified form of cover.

A is an outer tank, vessel, or box, for holding water, and also for receiving the milk vessel or can B, and it is provided with a lid by which it may be closed, and, preferably, has an outlet or spigot, to facilitate the running off of the water when desired.

The milk-vessel B may be of any appropriate material—say tin—and of any desired shape, but, preferably, cylindrical, and its cover C may be of any kind so long as it be capable of shedding water, so as not to allow it to drop into the milk. Over this cover I place a fibrous or kindred textile material, D—for example, a felted, woven, or knitted goods—which may be secured to the cover, and of sufficient size to permit its lower edges to drop into the water within the tank, this cover forming a sort of hood whose edges reach downward into the water.

When the milk has been placed in its can and the latter placed in the tank, either before or after the cool water (preferably about 45° Fahrenheit) has been put into it, and the cover put on, and the felt or other absorbent has its lower edge in the water, and the hood applied, which may be previously wetted—say by the act of pouring the water into the tank—it will be seen that, by capillary attraction, the hood D will be kept constantly wet, thus giving an even temperature to the entire can, and perfectly excluding from the inclosed milk all foreign matter and atmospheric influences. A blanket laid over the cover and dipping into the water will produce the same effect, and, if the tank be large enough, one blanket may serve for a number of cans.

As before remarked, by this improved method the total immersion of the can and its cover under water, or the filling of the tank up to and above the lower line of the cover, and the need of a weight or other device to fasten the cover down, are not necessary, and less labor is used in supplying or disposing of the water.

I draw off the milk from below the raised cream by means of an outlet at or near the bottom of the can, on the same general principle as in the Cooley process, leaving the cream in the can; but instead of an adjusting tube or device, previously adjusted to automatically arrest the flow when the milk has all been discharged, I place in the vertical wall of the can a small pane of glass, mica, or other translucent material, e, made water-tight, and rear to the outlet or cock f. Now, when the cream is raised, (which is greatly accelerated under the closed and cooling process,) and it is desired to draw off the milk from beneath this body of cream, the outlet at f is opened, and the milk drawn off as gradually as may be desired, without agitating or disturbing the cream, and when the cream becomes visible through the pane e, and its lower line has descended till it reaches the bottom of the can, the outlet or stop-cock f is closed, the flow of milk is cut off, and all the cream remains. The cream alone may now be either drawn off into another vessel, or may be emptied from the can.

The can may stand on feet or on slats, if desired.

I claim—

1. In an apparatus for raising cream from milk, the combination, with the milk-can and its cover C, of the hood or outer cover D, made of material adapted to serve as an absorbent and retainer of water, substantially as and for the purposes set forth.

2. The covered milk-can, provided, as described, with a translucent pane at its bottom part, and with an outlet or cock at or below its bottom line, substantially as and for the purposes set forth.

Dated February 9, 1877.

FRANCIS G. BUTLER.

Witnesses:
JOHN J. HALSTED,
PENN. HALSTED.